(12) United States Patent
Peng et al.

(10) Patent No.: US 7,788,276 B2
(45) Date of Patent: Aug. 31, 2010

(54) PREDICTIVE STEMMING FOR WEB SEARCH WITH STATISTICAL MACHINE TRANSLATION MODELS

(75) Inventors: Fuchun Peng, Sunnyvale, CA (US); Nawaaz Ahmed, San Francisco, CA (US); Yumao Lu, San Jose, CA (US); Marco J. Zagha, Belmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 254 days.

(21) Appl. No.: 11/843,560

(22) Filed: Aug. 22, 2007

(65) Prior Publication Data

US 2009/0055380 A1    Feb. 26, 2009

(51) Int. Cl.
*G06F 17/30*    (2006.01)
(52) U.S. Cl. .................................... 707/765
(58) Field of Classification Search ............ None
See application file for complete search history.

(56) References Cited

U.S. PATENT DOCUMENTS

| | | | | |
|---|---|---|---|---|
| 5,404,514 | A * | 4/1995 | Kageneck et al. | 707/5 |
| 5,802,515 | A * | 9/1998 | Adar et al. | 707/5 |
| RE36,727 | E * | 6/2000 | Kageneck et al. | 707/3 |
| 6,088,692 | A * | 7/2000 | Driscoll | 707/5 |
| 6,101,492 | A * | 8/2000 | Jacquemin et al. | 707/3 |
| 6,480,843 | B2 * | 11/2002 | Li | 707/5 |
| 6,772,150 | B1 * | 8/2004 | Whitman et al. | 707/6 |
| 7,152,064 | B2 * | 12/2006 | Bourdoncle et al. | 707/5 |
| 7,269,546 | B2 * | 9/2007 | Stensmo | 704/9 |
| 7,287,025 | B2 * | 10/2007 | Wen et al. | 707/5 |
| 7,440,941 | B1 * | 10/2008 | Borkovsky et al. | 707/5 |
| 2002/0052894 | A1 * | 5/2002 | Bourdoncle et al. | 707/513 |
| 2003/0014403 | A1 * | 1/2003 | Chandrasekar et al. | 707/5 |
| 2003/0028512 | A1 * | 2/2003 | Stensmo | 707/1 |
| 2003/0126235 | A1 * | 7/2003 | Chandrasekar et al. | 709/220 |

(Continued)

OTHER PUBLICATIONS

Carpineto, C. and G. Romano "Towards More Effective Techniques for Automatic Query Expansion", Proceedings of the 3rd European Conference on Research and Advanced Technology for Digital Libraries (ECDL '99), Sep. 22-24, 1999, pp. 126-141.*

(Continued)

*Primary Examiner*—Luke S Wassum
(74) *Attorney, Agent, or Firm*—Hickman Palermo Truong & Becker LLP; Christian A. Nichole (57) ABSTRACT

Techniques for determining when and how to transform words in a query to return the most relevant search results while minimizing computational overhead are provided. A dictionary is generated based upon words used in a specified number of previous most frequent search queries and comprises lists of transformations that may include variants based upon the stems of words, synonyms, and abbreviation expansions. When a query is received from a user, candidate queries are generated based upon replacing particular words in the query with a transformation of the particular words. Candidate queries are selected that have a high probability of returning relevant results by computing values of the query using language model scoring and translation scoring. The selected candidate queries and the original query are executed to return search results. The search results are displayed to the user with the words in the original query and the transformed words in bold.

32 Claims, 5 Drawing Sheets

U.S. PATENT DOCUMENTS

| | | | |
|---|---|---|---|
| 2004/0158560 A1* | 8/2004 | Wen et al. | 707/4 |
| 2005/0080772 A1* | 4/2005 | Bem | 707/3 |
| 2006/0074853 A1 | 4/2006 | Liu et al. | |
| 2006/0074891 A1* | 4/2006 | Chandrasekar et al. | 707/3 |
| 2006/0104515 A1 | 5/2006 | King et al. | |
| 2006/0224582 A1* | 10/2006 | Hogue | 707/6 |
| 2007/0088695 A1* | 4/2007 | Bleyendaal et al. | 707/5 |
| 2007/0214128 A1* | 9/2007 | Smith et al. | 707/4 |
| 2008/0016050 A1* | 1/2008 | Stensmo | 707/4 |
| 2008/0025618 A1 | 1/2008 | Minagawa et al. | |
| 2008/0114721 A1* | 5/2008 | Jones et al. | 707/2 |
| 2008/0147637 A1* | 6/2008 | Li et al. | 707/5 |
| 2008/0189262 A1* | 8/2008 | Peng et al. | 707/5 |
| 2008/0270364 A1* | 10/2008 | Bayardo et al. | 707/3 |
| 2009/0182729 A1* | 7/2009 | Lu et al. | 707/5 |

OTHER PUBLICATIONS

Shiri, A.A., C. Revie and G. Chowdhury "Thesaurus-Assisted Search Term Selection and Query Expansion: A Review of User-Centered Studies", Journal of Information Science, vol. 28, No. 2, 2002, pp. 111-122.*

Cronen-Townsend, S., Y. Zhou and W.B. Croft "A Framework for Selective Query Expansion", Proceedings of the 13th ACM Conference on Information Management and Knowledge Management (CIKM '04), Nov. 8-13, 2004, pp. 236-237.*

Shiri, A. and C. Revie "Query Expansion Behavior Within a Thesaurus-Enhanced Search Environment: A User-Centered Evaluation", Journal of the American Society for Information Science and Technology, vol. 57, No. 4, Feb. 15, 2006, pp. 462-478.*

Perez-Aguera, J.R. and L. Araujo "Query Expansion with an Automatically Generated Thesaurus", Proceedings of the 7th International Conference on Intelligent Data Engineering and Automated Learning (IDEAL 2006), LNCS 4224, Sep. 20-23, 2006, pp. 771-778.*

Bayardo, R.J., R. Jain, R. Srikant and D.L. Tang "Content Item Identification", U.S. Appl. No. 60/915,094, filed Apr. 30, 2007.*

Nanba, H. "Query Expansion Using an Automatically Constructed Thesaurus", Proceedings of the NTCIR-6 Workshop Meeting, May 15-18, 2007, pp. 414-419.*

Peng, F., N. Ahmed, X. Lin and Y. Lu "Context Sensitive Stemming for Web Search", Proceedings of the 30th Annual International ACM SIGIR Conference, Jul. 23-27, 2007.*

Araujo, L. and J.R. Perez-Aguera "Improving Query Expansion with Stemming Terms: A New Genetic Algorithm Approach", Proceedings of the 8th European Conference on Evolutionary Computation in Combinatorial Optimisation (EvoCOP 2008), LNCS 4972, , Mar. 26-28, 2008, pp. 182-193.*

Cronen-Townsend, S., Y. Zhou and W.B. Croft "A Language Modeling Framework for Selective Query Expansion", Technical Report IR-338, Center for Intelligent Information Retrieval, University of Massachusetts, 2004.*

Plachouras, V., B. He and I. Ounis "University of Glasgow at TREC2004: Experiments in Web, Robust and Terabyte Tracks with Terrier", Proceedings of the 13th Text REtrieval Conference (TREC 2004), Nov. 2004.*

Amati, G., C. Carpineto and G. Romano "Query Difficulty, Robustness and Selective Application of Query Expansion", Proceedings of the Annual European Conference on Information Retrieval (ECIR '04), 2004, pp. 127-137.*

Billerbeck, B. "Efficient Query Expansion", Ph.D. Thesis, School of Computer Science and Information Technology, RMIT University, Melbourne, Victoria, Australia, Sep. 2005.*

MacDonald, C., B. He, V. Plachouras and I. Ounis "University of Glasgow at TREC 2005: Experiments in Terabyte and Enterprise Tracks with Terrier", Proceedings of the 14th Text REtrieval Conference (TREC 2005), 2005.*

He, B. and I. Ounis "Query Performance Prediction", Information Systems, vol. 31, 2006, pp. 585-594.*

Chen, Stanley F., et al., "An Empirical Study of Smoothing Techniques for Language Modeling", Technical Report TR-10-98, Computer Science Group, Harvard University, 1998, 64 pages.

Brown, Peter F., et al., "The Mathematics of Machine Translation: Parameter Estimation", Computational Linguistics, vol. 19, No. 2, 1993, 50 pages.

Chow, Yen-Lu et al., "The n-best algorithm: An efficient and exact procedure for finding the n most likely sentence hypotheses", In Proceedings of the IEEE International Conference on Acoustic, Speech, and Signal, Processing, 1990, 4 pages.

Google, Google search results of query "history of advertise", Retrieved from the Internet <URL: http://www.google.com/search?hl=en&client=firefox-US%3Aofficial&hs=Mt4 &q=history+of+advertise&btnG=Search> , retrieved on Jan. 8, 2008, 1 page.

U.S. Appl. No. 11/701,736, filed Feb. 1, 2007, Final Office Action, Mailed Jan. 28, 2010.

* cited by examiner

Language Model Score    Translation Score
               ↓                ↓
       403              405
$$\underline{401}\ P(Q'_1|Q_1)\ \propto\ \frac{P(Q'_1) \cdot P(Q_1|Q'_1)}{P(Q_1)}$$

PREDICTIVE STEMMING FOR WEB SEARCH WITH STATISTICAL MACHINE TRANSLATION MODELS

FIELD OF THE INVENTION

The present invention relates to search engines, and in particular, to determining whether and how to stem words in Web search queries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A search engine is a computer program that helps a user to locate information using alphanumeric input. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

Search engines order a list of files before presenting the list to a user. As used herein, "files" may refer, but is not limited to, any type of document that may be searched by a search engine, including web pages, web documents, or other retrievable files. To order a list of files, a search engine may assign a rank to each file in the list. When the list is sorted by rank, a file with a relatively higher rank may be placed closer to the head of the list than a file with a relatively lower rank. The user, when presented with the sorted list, sees the most highly ranked files first. To aid the user in his search, a search engine may rank the files according to relevance. Relevance is a measure of how closely the subject matter of the file matches the user's query terms.

To find the most relevant files, search engines typically try to select, from among a plurality of files, files that include many or all of the words that a user has entered into a search request. Unfortunately, the files in which a user may be most interested are too often files that do not exactly match the words that the user entered as query terms.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, transforming certain terms in a search query to other forms of the word based upon the word stem may often return more relevant search results. As used herein, a word stem is the part of a word that is common to all of the word's inflected variants. For example, consider the word "advertising." From this word, the variants "advertisements," "advertisement," "advertise," "advertiser," and "advertises" are based on the word stem "advertis-". Though transforming query terms may result in more relevant search results, indiscriminately transforming to each variant of the word greatly increases computational overhead while possibly reducing the precision of the search. In another embodiment, transforming words based upon synonyms, abbreviations or other expansions may also return more relevant search results to a user.

In an embodiment for implementing searches that transform query terms to forms of the term based upon the query term's stem, the search engine transforms every possible word in the query to every possible form of the query term. The search engine performs this by comparing each word in the query with entries in a dictionary. Each word variant found in the dictionary is included in the search for every word where there is a match. For example, the search query "history of advertising" is converted to "[history OR histories] of [advertising OR advertisement OR advertiser OR advertisers]" based upon variants located in the dictionary. Eight different combinations of the search query, or candidate queries, may be generated from the original query. The eight combinations, according to the above search query and transformations, are as follows:

$Q_1$: history of advertising
$Q_2$: history of advertisement
$Q_3$: history of advertiser
$Q_4$: history of advertisers
$Q_5$: histories of advertising
$Q_6$: histories of advertisement
$Q_7$: histories of advertiser
$Q_8$: histories of advertisers Even more combinations of the search query may result if the dictionary includes more variants than those listed above. Additional combinations may also result if the dictionary comprises synonyms and abbreviation expansions of words.

Unfortunately, the results received based upon the updated query may have reduced precision. The large number of search words increases the probability that less relevant files will be returned in the search result. Some less relevant files may find their way on the final search list and may be highly ranked because non-relevant transformed words are recited in the documents.

Additionally, the computational resources, or overhead, required for the search engine to convert every word to each of the word's variant forms is very high. The process, as indicated above, entails searching for each query word in the dictionary, finding each word's transformation and then including the transformed word in the query. All of these actions are performed dynamically once the user enters her query and may noticeably slow the display of the search result. This problem is exacerbated in the circumstance of a large search engine because thousands or hundreds of thousands of queries are made at the same time.

If more precision were used to select the words to transform and the variants of the transformation, then computational overhead may be minimized. For example, the query "history of advertising" requires at least eight different combinations of searches and transformations based upon the above implementation. By using more intelligent techniques to determine that certain terms, e.g. "advertiser," may not result in more relevant search results when the word "advertising" is entered, some combinations of the search query are eliminated. By determining that some transformations of words are not likely to result in relevant search results, overhead may be reduced without minimizing the effectiveness of this technique.

Figure 1:
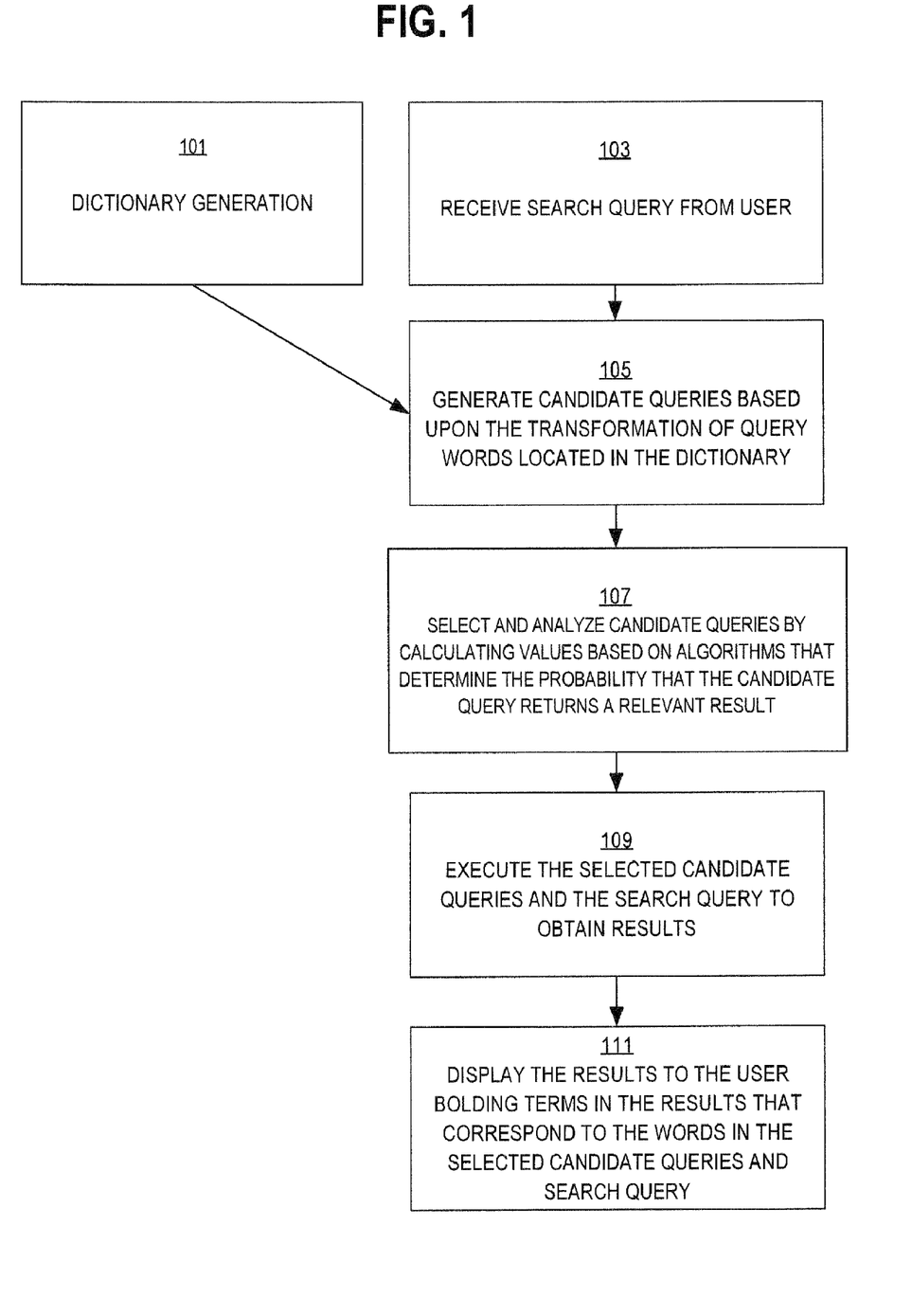
FIG. 1 is a flow diagram displaying an overview of determining when and how to transform one or more words in a search query to retrieve relevant results, according to an embodiment of the invention.

Determining when and how to transform an original query term into a variant form of the query term's stem word, a synonym, or other expansion, is important in order to obtain the most relevant search results with minimal overhead. FIG. 1 is a block diagram showing an overview of an embodiment of this technique. First, in step 101, a dictionary is generated offline. The contents of the dictionary may be based upon the most frequently entered search queries and contain a variety of different word variants and expansions into which a search word may be transformed. In step 103, a search query is received from the user. Then in step 105, candidate queries are generated that are based upon the transformation of query words located in the dictionary. In step 107, an analysis is performed for the candidate queries using algorithms to calculate a probability of the candidate query to retrieve relevant results. The candidate queries with the highest scores are then selected. For example, the user might enter the query "history of advertising." A selection of candidate re-writes of the original query are made based upon entries in the dictionary. Using a mathematical model, the candidate re-writes are analyzed using various algorithms. The candidate re-writes are sorted based upon probability to return a relevant result and a determination is made as to which candidate queries to execute. In step 109, during the execution phase, the search query and selected re-written candidates are executed on the search engine to retrieve search results. Finally in step 111, during the presentation phase, the results of the search are displayed to the user. Terms are bolded that correspond to the search query and determinations are made as to which portions of a file are shown as representative of the particular result.

Figure 2:
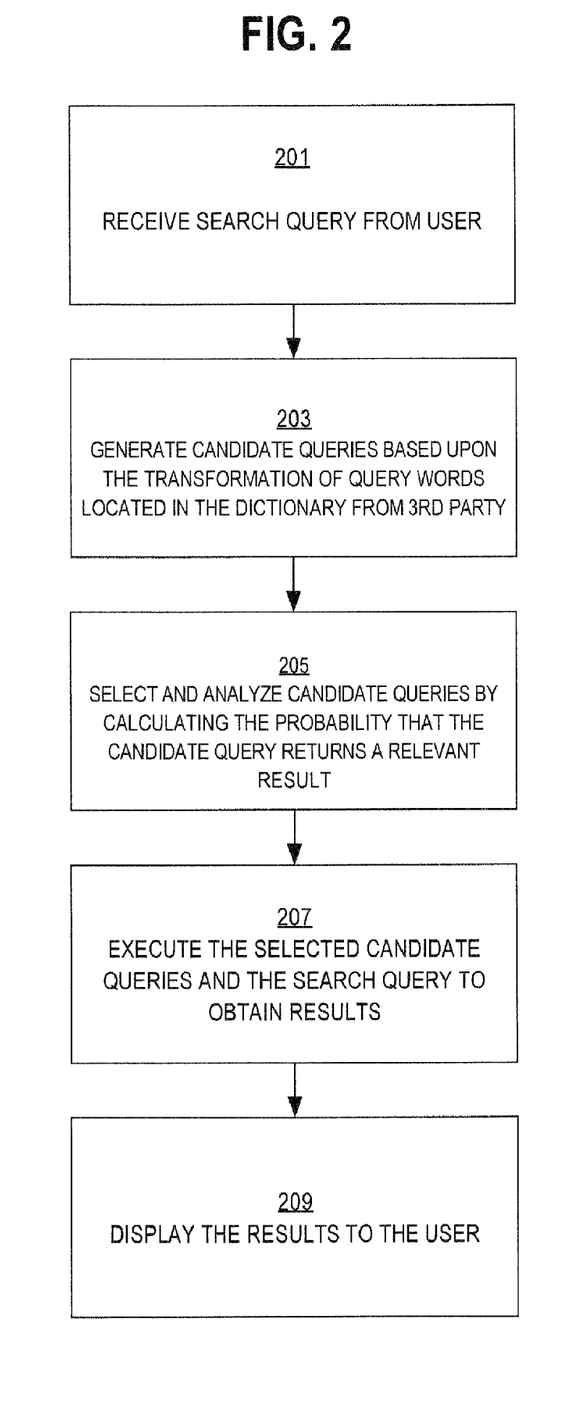
FIG. 2 is a flow diagram displaying another overview of determining when and how to transform one or more words in a search query to retrieve relevant results using a dictionary from a third-party, according to an embodiment of the invention.

In another embodiment, word transformations are found with a dictionary obtained from a third party. FIG. 2 is a flowchart diagram illustrating this technique. In step 201, a search query is received from the user. In step 203, candidate queries are generated based upon the transformation of query words located in a dictionary obtained from a third party. In step 205, an analysis is performed for the candidate queries to calculate a probability of the candidate query to retrieve relevant results. Candidate queries with the highest probability to retrieve relevant results are selected. In step 207, during the execution phase, the search query and selected re-written candidates are executed on the search engine to retrieve search results. In step 209, results of the search are displayed to the user.

Figure 3:
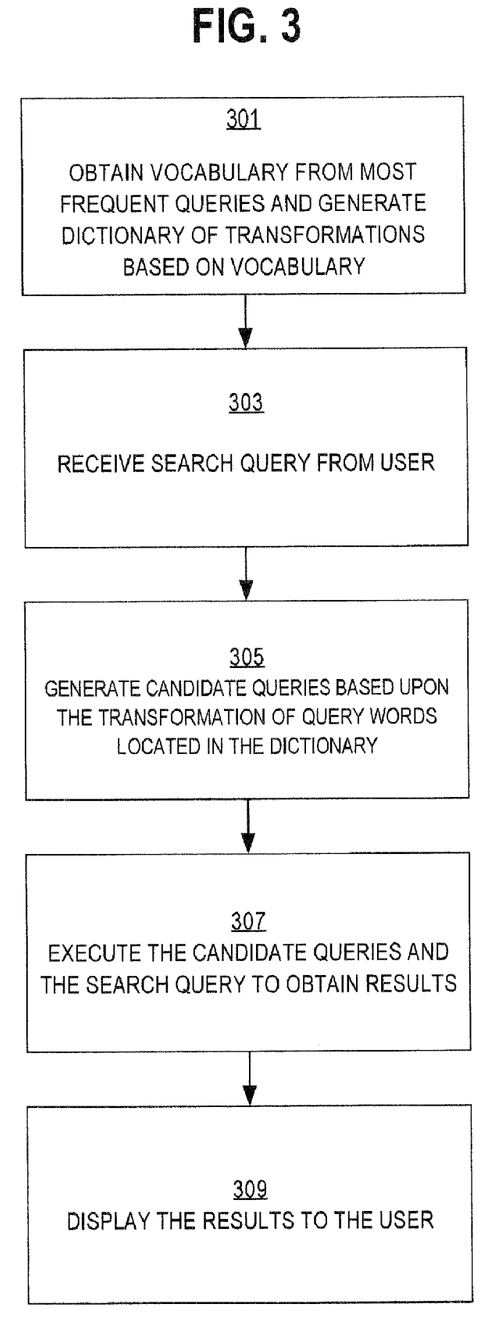
FIG. 3 is a flow diagram displaying yet another overview of determining when and how to transform one or more words in a search query to retrieve relevant results using a generated dictionary, according to an embodiment of the invention.

In another embodiment, word transformations are determined based on a generated dictionary. FIG. 3 is a flowchart diagram illustrating this technique. In step 301, a vocabulary of all words used in a specified number of most frequently entered search queries submitted by users. From this list of words, a dictionary is generated that comprises transformations of each of the words in the list. In step 303, a search query is received from the user. In step 305, candidate queries are generated based upon the transformation of query words located in the generated dictionary. In step 307, the search query and selected re-written candidates are executed on the search engine to retrieve search results. Finally, in step 309, results of the search are displayed to the user.

Offline Dictionary Generation

In an embodiment, a dictionary is generated prior to receiving a query from a user. The dictionary is generated in non-real time so that dictionaries are not generated for each search received. This alleviates excessive overhead for each search.

In an embodiment, the contents of the dictionary are based upon words found in a number of prior specified searches. The advantage of using this method is that the size of the dictionary to maintain is not unnecessarily large and contains words actually used in previous queries. The number of most frequently used search queries upon which the dictionary is based may vary, but offers a representative sample of most queries that may be expected. One embodiment is based on the 25 million most frequent previous queries. A vocabulary list is created that contains all of the query words encountered in the specified most frequently used search queries.

In an embodiment, the stem of each word in the vocabulary list is then determined. The stem of a word is the combination of the basic form of a word, or root word, plus any suffix of the word. For example, the word "advertises" contains the suffix "-s" with the stem "advertis-". In an embodiment, words on the vocabulary list are sent to a third party application which returns the stem of each word.

In an embodiment, once the stems of the words are found, the word stems are retained in the dictionary and variants of the word stems are populated that are associated with each stem. From the above example, the word "advertises" was found in the 25 million prior search queries. The stem of "advertises" is determined to be "advertis-" through a third-party application or any other technique through which the stem of a word may be found.

In another embodiment, an approach based on context analysis of words occurring in documents may be used to create word stem candidates. The approach is based on the assumption that words occurring in the same context will have similar meaning. For a given word, word pair similarities are calculated between the given word and all possible words. Further information on calculating similarities may be found in the reference, "Automatic Retrieval and Clustering of Similar Words" by Dekang Lin (36th Annual Meeting of the Association for Computational Linguistics and 17th International Conference on Computational Linguistics, Proceedings of the Conference, Vol. II, pp. 768-775, Montreal, Canada, August 1998) which is incorporated by reference herein. After calculating word pair similarities, the top twenty results of morphologically similar words are selected. For example, the most similar words to "develop" might be "developing," "developed," "incubator," "develops," "development," "tutoring," "analyzing," "development," and "automation." The most morphologically similar of these words are kept as word stem candidates. In the example, these words would be "developing," "developed," "develops," and "development."

In an embodiment, variants and expansions of the word may be collected from other dictionaries and lists, the specified number of prior searches, or through any other means in which to collect variants or expansions. As used herein, variants and expansions may include, but are not limited to, variants of a word based on the word stem, synonyms, or abbreviations. An example of a variant of a word stem for the word "advertises" might be the word "advertising" as both of these words share the stem "advertise." An example of a synonym for the word "prison" might be the words "penitentiary" and "jail" as these words have a similar meaning to the word "prison." An example of an expansion of an abbreviation for the term "era" might be "earned run average," referencing the term associated with baseball, or "equal rights amendment," referencing the movement for laws espousing equal rights for males and females.

In an embodiment, the dictionary comprises only variants of word stems. In other embodiments, the dictionary comprises combinations of variants of word stems, synonyms, and abbreviation expansions. For example, one dictionary may comprise variants of word stems and synonyms, and another dictionary may comprise synonyms and abbreviation expansions.

In an embodiment, the dictionary is not updated with new search queries continuously. This may result in needless overhead for dictionary generation. Rather, the dictionary is updated on a periodic schedule so that the transformation lists are an accurate representation of query words encountered. Generation of a dictionary after the initial process may occur monthly, quarterly or any other period of time that may be specified.

Candidate Re-write Analysis

In an embodiment, once a user submits a multi-word query for a search, one or more words in the search query are matched to entries in the dictionary. Candidate search queries are generated based upon the contents of the transformations for the query words located in the dictionary. Thus for example, the search query "history of advertising" from the previous section, might generate eight candidate search queries based upon variants of word stems. In an embodiment, all variant search queries are executed in order to obtain a results list. In another embodiment, the candidate search queries are analyzed in order to determine which candidate search queries have a high probability to return the most relevant search results.

In an embodiment, one word queries are not transformed, two to three word queries allow transformations of only one word, and queries of four words or more are allowed transformations of two words less than the query length. No transformations are made in one word queries because there is no context information available to decide if the conversion is useful. Two to three word queries contain mostly a single concept and thus only one word is transformed. In longer queries, two or more words may be transformed as the context of the query may be better determined.

In an embodiment, the N-best algorithm is used to determine an ordered list of the best candidate queries to use in execution. A more detailed explanation of N-best scoring may be found in the reference "The N-Best Algorithm: An Efficient Procedure for Finding Top N Sentence Hypotheses" by Yen-Lu Chow and Richard Schwartz, (In Proceedings of the IEEE International Conference on Acoustic, Speech, and Signal, Processing, pages 81-84, 1990) which is hereby incorporated herein by reference.

For example, if a ten word query, $w_1w_2w_3w_4w_5w_6w_7w_8w_9w_{10}$, had five transformations (or candidates) for each of the words in the query, then there would be $5^{\wedge}10$ candidates that would need to be evaluated. This number may be minimized with the N-best algorithm as a selection is made of only the top, or best, candidates.

The N-best algorithm uses knowledge sources, which may include speech, statistical N-gram, and natural language models, to determine the word that follows another word in a phrase. The probability of the following word occurring is also calculated. By implementing the N-best algorithm, the candidate queries are ordered into a list based on the most probable outcomes. The best candidate queries may then be further analyzed to determine which candidate queries to execute.

Without the N-best algorithm, the number of candidate queries is the (number of candidates)^(number of query words). The N-best algorithm may reduce the candidates to (number of candidates)*(number of query words). Any other algorithm may be used that determines the best candidate queries to analyze. By reducing the number of candidates to analyze, this method greatly decreases the overhead associated with analyzing the candidates. This is especially important as the analysis of candidate queries is performed in real time.

In an embodiment, the process to determine which candidate search queries will return the most relevant search results is through mathematical modeling. In mathematical modeling, values are assigned to each of the candidate search queries based upon a variety of techniques and the candidates with the highest scores are executed to generate search results.

Figure 4:
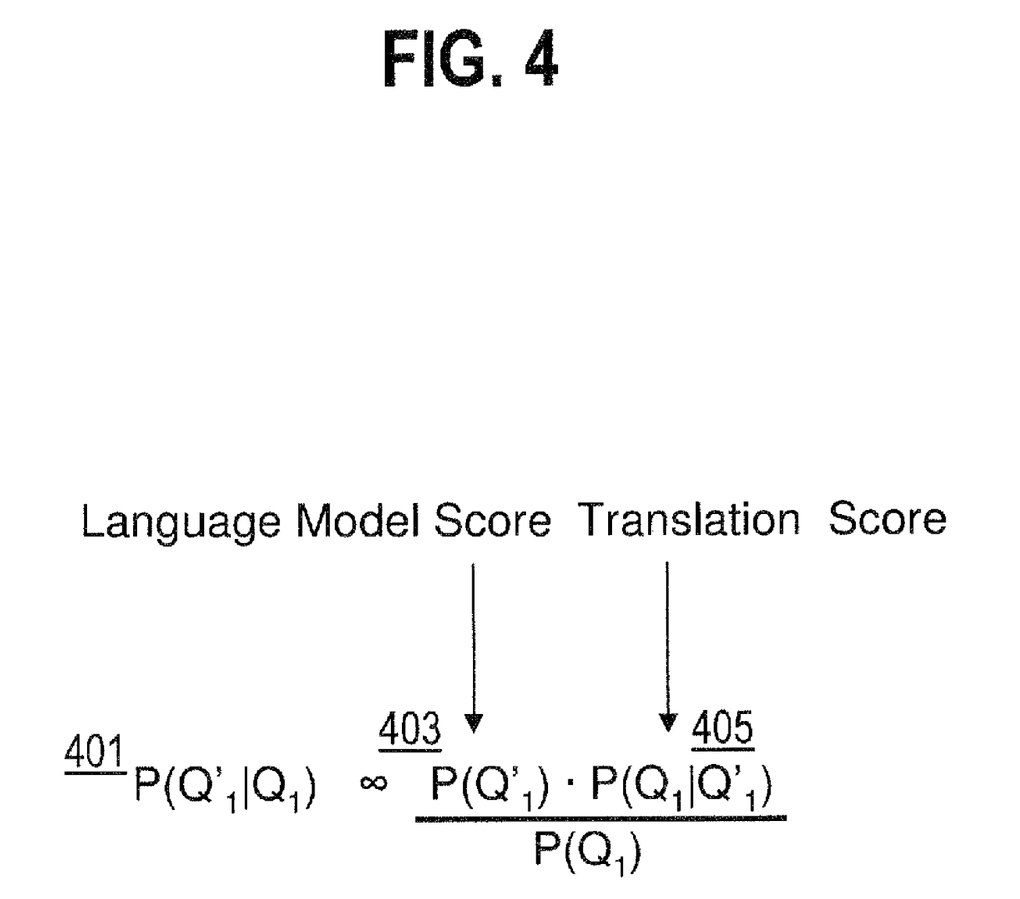
FIG. 4 is a formula to calculate a value to determine the probability of a candidate query to return relevant results with respect to the original query, according to an embodiment of the invention.

In an embodiment of the invention, a formula is presented of mathematical modeling in FIG. 4. In FIG. 4, $P(Q'_1|Q_1)$ 401 represents the value of the candidate query, $Q'_1$, with respect to the original query, $Q_1$, obtained when a language model score and a translation score are calculated for the candidate query, $Q'_1$. For example, consider once again the query "history of advertising" presented in the previous sections. "History of advertising" possessed eight candidate queries. $Q_6$, "histories of advertisements" is one of the candidate queries. $P(Q'_1)$ 403 represents the language model score and provides an indication of how often the candidate query occurs in files to be searched. Further details of the language model score are given below. $P(Q_1|Q'_1)$ 405 represents the translation score and provides an indication of whether the candidate query, $Q'_1$, occurs in the same context as the original search query, $Q_1$. Further details on translation score are provided below.

In an embodiment, calculating a language model score is used to determine which candidate search queries are executed. Language modeling calculates, given a corpus of web files, the number of times a phrase occurs within the corpus. As used herein, a corpus is a given set of files. The corpus may be the entire Internet, or a small collection of files on a single web server. A more detailed explanation of language scores may be found in "An Empirical Study of Smoothing Techniques for Language Modeling" by Stanley F. Chen and Joshua T. Goodman (Technical Report TR-10-98, Computer Science Group, Harvard University, 1998), which is incorporated herein by reference.

In an embodiment, a notation of a language score is as follows:

$$P(Q_1) = \frac{\#(w_1 w_2 w_3 w_4 w_5)}{\Sigma(*)}$$
$$= P(w_1) \cdot P(w_2 | w_1) \cdot P(w_3 | w_2 w_1) \cdot P(w_4 | w_3 w_2 w_1) \cdot$$
$$P(w_5 | w_4 w_3 w_2 w_1)$$

The query $Q_1$ is comprised of the five word query, "$w_1 w_2 w_3 w_4 w_5$," with each "$w_n$" representing the $n^{th}$ word of the query. $P(Q_1)$ is equal to the number of times the query, "$w_1 w_2 w_3 w_4 w_5$," appears within the corpus "*."

The score may also be expanded to $P(w_1) \cdot P(w_2|w_1) \cdot P(w_3|w_2 w_1) \cdot P(w_4|w_3 w_2 w_1) \cdot P(w_5|w_4 w_3 w_2 w_1)$. To understand the meaning of this notation, consider the formula:

$$P(w_5 | w_4 w_3 w_2 w_1) = \frac{\#(w_1 w_2 w_3 w_4 w_5)}{\#(w_1 w_2 w_3 w_4)}$$

$P(w_5|w_1 w_2 w_3 w_4)$ returns the frequency of occurrences of the phrase, "$w_1 w_2 w_3 w_4 w_5$," in files that also contain the phrase, "$w_1 w_2 w_3 w_4$" within a given corpus.

Rather than performing a full calculation based on all words in the phrase as $P(w_5|w_1 w_2 w_3 w_4)$ shows, N-gram models may be employed. In N-gram models, not all words of the phrase are used to calculate the frequency of occurrences. For example, in a 4-gram model, $P(w_5|w_2 w_3 w_4)$, the word phrase, "$w_2 w_3 w_4 w_5$," is counted in all files that also contain the three preceding words, "$w_2 w_3 w_4$". In a tri-gram model, such as $P(w_5|w_3 w_4)$, the word phrase, "$w_3 w_4 w_5$," is counted in files that also contain the two preceding words, "$w_3 w_4$". In a bi-gram model, the word phrase, "$w_4 w_5$," is counted in files that also contain the preceding word, "$w_4$". This is represented as $P(w_5|w_4)$. Each N-gram increases overhead as the value of N increases.

The language model score also determines the probability, given a specified number of words, of what the word following the specified word would be. For example, given the phrase "President of the United ______," the language score determines a probability of what the word following "United" might be. Depending upon the corpus, "States" might receive a high probability and "Nations" would receive a lower probability. Thus, if a query candidate was generated that contained the word "Nations" instead of "States," then the query candidate might receive a low score and not be executed for the final search result.

In an embodiment, a translation score is determined that provides a probability of a candidate query in documents that also contain the original query. This value is determined in order to ensure that the candidate query is in the same context as the original query. A more detailed explanation of translation scores may be found in "The Mathematics of Machine Translation: Parameter Estimation" by Peter F. Brown, Vincent J. Della Pietra, Stephen A. Della Pietra, and Robert L. Mercer (Computational Linguistics, Vol. 19, Num. 2, pages 263-311, 1993), which is incorporated herein by reference.

In an embodiment, translation scoring is represented by the notation $P(Q'_1|Q_1)$. For example, if the original query, $Q_1$, is "history of advertisement" and the candidate query, $Q'_1$, is "history of advertising," then the number of occurrences of the phrase "history of advertising" is determined where the document also contains the original query phrase "history of advertisement."

The notation may be further written as:

$$P(Q'_1|Q_1), \text{ where } Q_1 = w_1 w_2 w_3 \text{ and } Q'_1 = w'_1 w'_2 w'_3$$

The original query, $Q_1$, is the phrase, "$w_1 w_2 w_3$," or, "history of advertisement" and the candidate query, $Q'_1$, is transformed phrase, "$w'_1 w'_2 w'_3$," or "history of advertising." The formula may then be expanded to:

$$P(Q'_1|Q_1) = P(w'_1|w_1) \cdot P(w'_2|w_2) \cdot P(w'_3|w_3)$$

$P(w'_1|w_1)$ indicates the number of occurrences of the transformed word, "$w'_1$," in documents that also contain the original query word, "$w_1$." This is performed for each word in the query phrase. Thus, a translation score of each word in the query is determined to find the translation score of the entire query.

Translation scoring is more pronounced in instances where words from the same stem are out of context. For example, given the word "morale," a candidate based on the stem word might be "morales" which merely adds the suffix "-s." However, "morales" may appear in many documents as the last name "Morales." In order to attain documents that retain the context of the original query, the candidate query word must appear in documents that contain the original query. Thus, many instances of "Morales," when used as a last name, may be discarded.

In an embodiment, another scoring method used to determine whether candidate re-write queries return relevant results is "click-through rates" or "CTRs." Click-through rates are based upon a user's response to a list of results. If a user clicks on a file in a result list, then the user has "clicked-through" to the resulting file. These actions are recorded by a search engine in order to determine the relevance of files when a results list is presented. In aggregate, when a document has a higher click-through rate than another file when presented with the same search query, the files with the higher click-through rate are more relevant. These scores may also be used to determine which candidate re-write queries to execute. Additional criteria for click-through rates may also by used. For example, click-through rates might be normalized based on the location of the results presented on the search results page. Results higher on the list would be expected to receive more clicks than results lower on the list. If the tenth item on the results list received the same number of click-throughs as the first item on the list, then the click-through score of the tenth item would be higher once the score is normalized to reflect the tenth item's location.

In another embodiment, any other scoring method used to determine more relevant results may be used to select which candidate re-write queries to execute. An example might be inverse document frequency weight. Inverse document frequency weight is a statistical measure used to evaluate how important a word is to a document in a collection or corpus. The importance increases proportionally to the number of times a word appears in the document but is offset by the frequency of the word in the corpus. Many other scoring methods may be used to determine which of the candidate queries to execute.

In an embodiment, the scores are calculated based upon the mathematical model and the candidate search queries with the highest values are selected to be executed. In another embodiment, if the score of a candidate search query attains at least a specified score, then that candidate search query is selected. When candidate search queries are selected, the candidate search queries, along with the original search query submitted by the user, are executed to obtain search results.

Execution Phase and Context of the Search

In an embodiment, the word that is transformed must remain within the context of the original search in order to return a result. This context is ensured by requiring the transformed word and the neighboring words located in the original query to be within the same window unit of the file. A window unit is specified by a number, and that number indicates the number of sequential words that are scanned at any given time. With a window unit of size four, four words are examined at a time.

For example, assume the following sentence is contained in a web file, "Stores have many running shoes in stock" and that the original search query is "shoe store". If the word "store" is transformed to "stores" as a variant of the stem, the neighboring word in the search query is "shoe." However, the neighboring word, "store" might not be within the same window unit as "stores." The window unit, as indicated between '[ ]', would be "[Stores have many running] shoes in stock" or "Stores [have many running shoes] in stock". Thus, this web file would not be included in the search results.

However, if in the above example, the search query was "running shoe", and the word "shoe" was transformed to the word "shoes," the neighboring word "running" is within the same window unit as the transformed word. This is shown in "Stores have [many running shoes in] stock". Thus, this web file would be included in the search result.

In another embodiment, the word that is transformed may also be within the context of one of the other transformed words in a candidate query. For example, consider that the original search is "history of advertising" and the other candidate queries that are executed are "histories of advertisements" and "history of advertisers." A web file would be included in the search result if a transformed word is in the same window unit as another transformed word. A file with the phrase "The [histories of advertisers in] the U.S. and the U.K." appears in the results because the transformed word appears in the same window unit, or context, as another transformed word. The original neighboring words are not located in the same window unit as the transformed words.

Presentation Phase

A list of results is displayed to the user once his query has been executed. The lists may be ordered in a variety of methods including, but not limited to, relevance to the query or the age of the web file. In an embodiment, small portions of the web file are displayed to the user in the results list. The small portion includes the word or words from the executed queries that appear in the document with the query words highlighted in the portion of the web document displayed to the user.

In an embodiment, the highlighted words in the portion of the web document displayed are limited to the words only in the original query. Thus, if the query, "history of advertisements," was executed with the transformed word, "advertiser," the search engine would not highlight the word "advertiser" if that word appeared in the portion of the web document.

In another embodiment, the highlighted words in the portion of the web document displayed are words both in the original query and in any of the transformed words in the query candidates. Thus, if transformations were used that are based on the stem word of "advertising," then "advertiser," "advertises," and any other transformed word used in the executed candidate queries would be highlighted by the search engine in the results list shown to the user.

Hardware Overview

Figure 5:
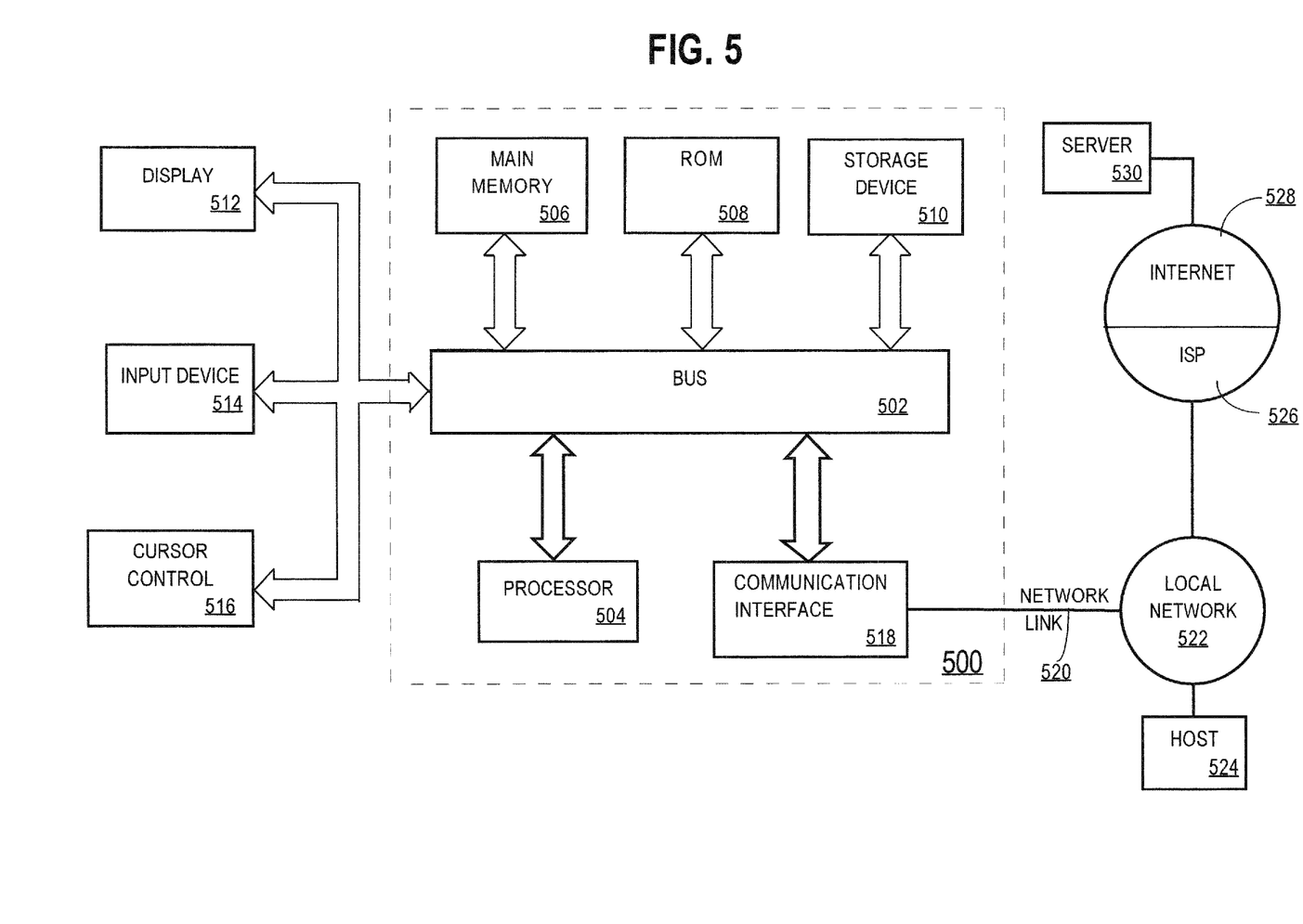
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving a particular query comprising a plurality of words;
   determining stems to at least one of the words in the particular query;
   based on the stems of the plurality of words in the particular query, determining whether one or more stems of particular words in the particular query occurs in a dictionary comprising one or more transformations based upon stems of words;
   selecting, from the dictionary, one or more transformations of the one or more stems of the particular words;
   generating at least one candidate query that includes a transformation of one or more particular words;
   computing a value for each candidate query;
   selecting at least one candidate query to execute based upon the computed value for each candidate query;
   executing the particular query and the at least one selected candidate query to generate search results across a plurality of documents; and
   displaying at least a portion of the search results,
   wherein the method is performed by one or more computing devices.

2. The method of claim 1, wherein the dictionary is generated prior to receiving a particular query from the user.

3. The method of claim 2, wherein the dictionary is based upon words used in a certain number of previous most frequent search queries.

4. The method of claim 1, wherein the dictionary is from a third-party provider.

5. The method of claim 1, wherein the one or more transformations of words in the dictionary includes synonyms of the words.

6. The method of claim 1, wherein the one or more transformations of words in the dictionary includes abbreviations of the words.

7. The method of claim 1, wherein the one or more transformations of words in the dictionary includes expansions of the words.

8. The method of claim 1, wherein the computing step uses a language model scoring algorithm.

9. The method of claim 1, wherein the computing step uses a language transformation scoring algorithm.

10. The method of claim 1, wherein the computing step uses a click-through rate scoring algorithm.

11. The method of claim 1, wherein the computing step uses an N-best scoring algorithm.

12. The method of claim 1, wherein displaying at least a portion of the search results further comprises:
    displaying a portion of the search results that contain the one or more particular words of the particular query or the transformations of the stem of the one or more particular words of the particular query.

13. The method of claim 12, wherein the one or more particular words of the particular query or the transformation of the stem of the one or more particular words of the particular query shown in the portion of the result is highlighted.

14. The method of claim 1, wherein the results further comprises documents that contain the transformation of the one or more particular words in the context of one or more particular words, or transformations of the one or more particular words, of the particular query.

15. A method, comprising:
receiving a particular query from a user;
based on the particular query, determining whether one or more particular words in the particular query is able to be transformed;
determining one or more transformed forms of the one or more particular words;
determining whether using the one or more transformed forms of the one or more particular words has a probability to produce relevant search results that is higher than a specified threshold;
in response to determining that transforming the one or more particular words has a probability to produce relevant search results that is higher than a specified threshold, using a particular word and a transformed word for the particular word within a version of the particular query;
generating search results across a plurality of documents based on executing the particular query and the version of the particular query; and
displaying at least a portion of the search results;
wherein the method is performed by one or more computing devices.

16. The method of claim 15, wherein the transformations are variants based upon stems of words.

17. A machine-readable storage medium carrying one or more sequences of instructions which, when executed by one or more processors, causes the one or more processors to perform a method comprising:
receiving a particular query comprising a plurality of words;
determining stems to at least one of the words in the particular query;
based on the stems of the plurality of words in the particular query, determining whether one or more stems of particular words in the particular query occurs in a dictionary comprising one or more transformations based upon stems of words;
selecting, from the dictionary, one or more transformations of the one or more stems of the particular words;
generating at least one candidate query that includes a transformation of one or more particular words;
computing a value for each candidate query;
selecting at least one candidate query to execute based upon the computed value for each candidate query;
executing the particular query and the at least one selected candidate query to generate search results across a plurality of documents; and
displaying at least a portion of the search results.

18. The machine-readable storage medium of claim 17, wherein the dictionary is generated prior to receiving a particular query from the user.

19. The machine-readable storage medium of claim 18, wherein the dictionary is based upon words used in a certain number of previous most frequent search queries.

20. The machine-readable storage medium of claim 17, wherein the dictionary is from a third-party provider.

21. The machine-readable storage medium of claim 17, wherein the one or more transformations of words in the dictionary includes synonyms of the words.

22. The machine-readable storage medium of claim 17, wherein the one or more transformations of words in the dictionary includes abbreviations of the words.

23. The machine-readable storage medium of claim 17, wherein the one or more transformations of words in the dictionary includes expansions of the words.

24. The machine-readable storage medium of claim 17, wherein the computing step uses a language model scoring algorithm.

25. The machine-readable storage medium of claim 17, wherein the computing step uses a language transformation scoring algorithm.

26. The machine-readable storage medium of claim 17, wherein the computing step uses a click-through rate scoring algorithm.

27. The machine-readable storage medium of claim 17, wherein the computing step uses an N-best scoring algorithm.

28. The machine-readable storage medium of claim 17, wherein displaying at least a portion of the search results further comprises displaying a portion of the search results that contain the one or more particular words of the particular query or the transformations of the step of the one or more particular words of the particular query.

29. The machine-readable storage medium of claim 28, wherein the one or more particular words of the particular query or the transformations of the stem of the one or more particular words of the particular query shown in the portion of the result is highlighted.

30. The machine-readable storage medium of claim 17, wherein the results further comprises documents that contain the transformation of the one or more particular words in the context of one or more particular words, or transformations of the one or more particular words of the particular query.

31. A machine-readable storage medium carrying one or more sequences of instructions which, when executed by one or more processors, causes the one or more processors to perform a method comprising:
receiving a particular query from a user;
based on the particular query, determining whether one or more particular words in the particular query is able to be transformed;
determining one or more transformed forms of the one or more particular words;
determining whether using the one or more transformed forms of the one or more particular words has a probability to produce relevant search results that is higher than a specified threshold;
in response to determining that transforming the one or more particular words has a probability to produce relevant search results that is higher than a specified threshold, using a particular word and a transformed word for the particular word within a version of the particular query;
generating search results across a plurality of documents based on executing the particular query and the version of the particular query; and
displaying at least a portion of the search results.

32. The machine-readable storage medium of claim 31, wherein the transformations are variants based upon stems of words.

* * * * *